United States Patent
Julian

[11] Patent Number: 5,825,324
[45] Date of Patent: Oct. 20, 1998

[54] PASSIVE RANGING OF A NOISE BEACON USING CORRELATION MONOPULSE PROCESSING ON THE DIRECT AND BOUNCE EMISSIONS

[75] Inventor: Michael D. Julian, Playa Del Rey, Calif.

[73] Assignee: Raytheon Company, Los Angeles, Calif.

[21] Appl. No.: 678,385

[22] Filed: Jun. 28, 1996

[51] Int. Cl.[6] .................................................. G01S 13/08
[52] U.S. Cl. .......................... 342/118; 342/125; 342/126; 342/145; 342/13
[58] Field of Search .............................. 342/13, 118, 125, 342/126, 145

[56] References Cited

U.S. PATENT DOCUMENTS

| | | | |
|---|---|---|---|
| 2,837,738 | 6/1958 | Valkenburgh | 342/13 |
| 3,210,762 | 10/1965 | Brabant | 342/145 |
| 3,218,642 | 11/1965 | Newhouse et al. | 342/118 |
| 3,242,490 | 3/1966 | Wentworth et al. | 342/13 |
| 3,943,514 | 3/1976 | Afendykiw et al. | 342/125 |
| 4,370,656 | 1/1983 | Frazier et al. | 342/13 |
| 5,008,543 | 4/1991 | Bertrand et al. | 250/342 |
| 5,327,145 | 7/1994 | Jelinek | 342/453 |

*Primary Examiner*—J. Woodrow Eldred
*Attorney, Agent, or Firm*—Leonard A. Alkov; Glenn H. Lenzen, Jr.

[57] ABSTRACT

In accordance with the teachings of the present invention, a passive tracking system (30) and method of passively determining a range (R) to a remote signal emitter (10) elevated a distance above ground level (14) is provided. The method includes aligning an antenna (32) also elevated above ground level (14) substantially in the direction of the remote signal emitter (10). The antenna (32) receives combined radiated energy along a direct path (16) from the remote signal emitter (10) as well as radiated energy that has bounced off the ground level (14) and has been received along a bounce path (18) from the remote signal emitter (10). The range (R) to the remote signal emitter (10) is calculated based upon the combined direct and bounce path signals. Correlation processing and geometric triangulation is employed to calculate the range (R) to the remote signal emitter (10).

8 Claims, 4 Drawing Sheets

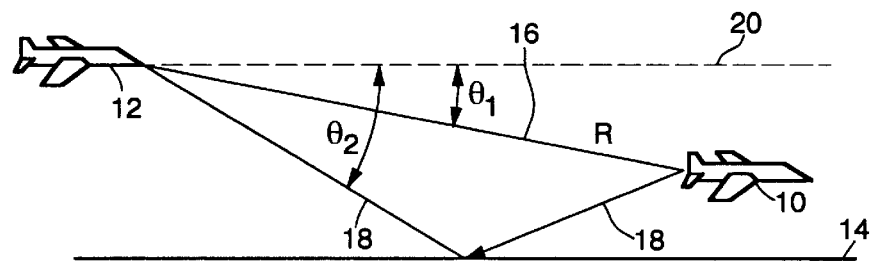
FIG. 1.
FIG. 2.
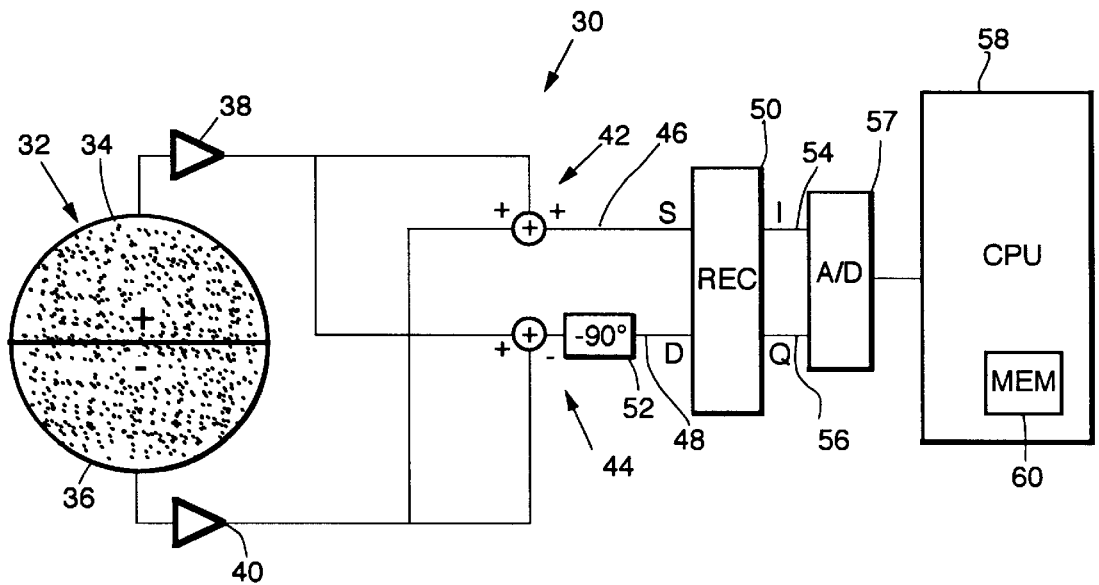

5,825,324

PASSIVE RANGING OF A NOISE BEACON USING CORRELATION MONOPULSE PROCESSING ON THE DIRECT AND BOUNCE EMISSIONS

BACKGROUND OF THE INVENTION

1. Technical Field

This invention relates to a method of passively determining the location of an airborne noise emitter or beacon and, more particularly, to a method of passively determining the range to an airborne noise emitter or beacon by determining the depression angles of direct and ground bounce signal paths and the difference in the lengths of the direct and bounce signal paths received by a single monopulse antenna.

2. Discussion of Related Art

In many environments it is desirable to passively determine the location of an airborne noise emitter or beacon, commonly referred to as a jammer, using a remote airborne tracking system. The use of current antenna systems for merely measuring and determining a depression angle to an airborne jammer often requires straight forward signal processing techniques. However, more complex signal processing schemes are required for determining the range from the tracking system to the jammer. Typically, when determining the location of an airborne jammer radiating energy, an airborne tracking system will receive radiated energy along a direct path from the jammer to the tracking system as well as radiated energy via the ground bounce specular reflection path. As such, in order to determine the location of the airborne jammer, the respective angles between a reference plane parallel to the ground and the direct and bounce paths must be determined. Additionally, the difference in lengths between the direct and bounce paths must be determined in order to calculate the range to the jammer through simple geometric triangulation.

Previously, tracking systems have commonly employed a receiver and two sequential re-positions of an antenna. First, the antenna is pointed along the direct path of the received energy and then along the bounce path of the received energy. Such a system allows for accurate monopulse angle measurements for each beam position. However, in many environments, the direct and bounce path directions from the jammer to the receiver may lie at approximately the same angle and be contained within the antenna beamwidth. As such, isolation of the direct and bounce paths by the separate positions of the antenna is substantially unattainable.

It is therefore desirable to provide a tracking system and method for passively determining the location of an airborne noise jammer radiating energy by sampling the direct and bounce path signals received from the noise jammer.

More particularly, it is desirable to provide a tracking system and method for passively determining the location of an airborne noise jammer radiating energy by using a single monopulse antenna for sampling the direct and bounce path signals contained in the received beamwidth.

SUMMARY OF THE INVENTION

In accordance with the teachings of the present invention, a passive tracking system and method of passively determining a range to a remote signal emitter elevated a distance above ground level is disclosed.

In accordance with the teachings of one embodiment of the present invention, the method includes aligning an antenna, elevated a distance above the ground level, substantially in the direction of the elevated remote signal emitter. The antenna receives radiated energy along a direct path from the remote signal emitter as well as radiated energy that has bounced off the ground and has been received along a bounce path from the remote signal emitter to form a composite signal. The range to the remote signal emitter is calculated based upon the combined direct and bounce path signals.

In accordance with a preferred embodiment, the antenna is a single monopulse antenna which is aligned substantially in the direction of a main beam of the radiated energy received from the remote signal emitter.

In accordance with another preferred embodiment, the step of calculating the range to the remote signal emitter includes generating sum and difference signal vectors from the received combined direct and bounce path signals. From the sum and difference signal vectors, angular and path length data associated with the direct and bounce path signals is determined and geometric triangulation calculations are performed to calculate the range to the remote signal emitter. The calculated range is stored in a memory device for further processing.

BRIEF DESCRIPTION OF THE DRAWINGS

Other objects and advantages of the present invention will become apparent to those skilled in the art upon reading the following detailed description and upon reference to the drawings in which:

FIG. 1 schematically illustrates an airborne noise emitter radiating energy along both direct and ground bounce paths that is received as a combined or composite signal by an airborne receiver including a passive tracking system;

FIG. 2 is a schematic diagram of the passive tracking system located within the airborne receiver in accordance with the teachings of the present invention;

DETAILED DESCRIPTION OF THE PREFERRED EMBODIMENTS

Figure 3:
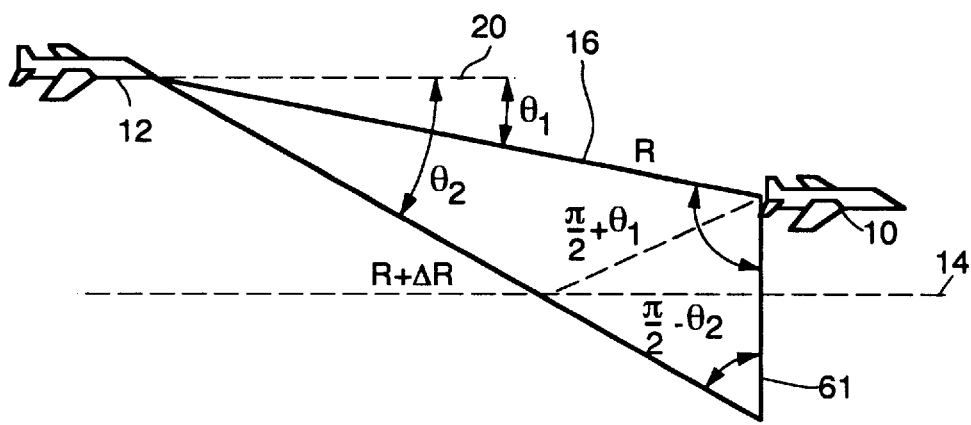
FIG. 3 schematically illustrates the method for calculating geometrically the range from the airborne noise emitter to the airborne tracking system based upon depression angles, $\theta_1$ and $\theta_2$, and the difference in lengths $\Delta R$ of the direct and bounce path signals that are combined to form the composite signal through the use of a triangulation calculation.

The following description of the preferred embodiments is merely exemplary in nature and is in no way intended to limit the invention or its application or its uses.

The present invention is particularly concerned with providing a passive tracking system and method of passively determining the range to an airborne noise emitter or beacon by determining depression angles between a reference plane, parallel to the ground, and the direct and ground bounce paths of radiated energy received by the tracking system as a combined signal as well as the associated path length differences. An advantage of the present invention is that only a single antenna, a two-channel receiver and processor are required for processing the direct and bounce signals located in the main beam of the received antenna. A combination of correlation and elevation monopulse processing determines both angles and the time delay between the direct and bounce signals which, in turn, allows the range to the airborne noise emitter to be determined through a simple geometric triangulation computation.

FIG. 1 schematically illustrates an airborne noise emitter 10 radiating energy towards an airborne remote receiver 12. As illustrated, the airborne noise emitter 10 and the remote receiver 12 may both be in the form of aircraft traveling distances above ground level 14. The remote receiver 12 receives the radiated energy via a direct path 16 as well as radiated energy that has reflected off the ground 14 via a ground bounce or specular reflection path 18. As a result, the receiver 12 receives a composite signal from the energy received along the direct and bounce paths 16 and 18. In order to determine the location of the airborne noise emitter 10, the depression angles $\theta_1$ and $\theta_2$ from a reference plane 20, which is substantially parallel to the ground level 14, must be determined. Additionally, the path length difference ($\Delta R$), shown in FIG. 3, between the direct path 16 and the bounce path 18 must be determined. Often, the depression angles $\theta_1$ and $\theta_2$ are nearly the same such that the direct path 16 and the bounce path 18 are contained in the main beam of the receiving antenna. As such, isolation of the direct path 16 and bounce path 18 through the use of separate positions of the antenna is substantially unattainable.

With reference to FIG. 2, a passive tracking system 30 located within the remote receiver 12 is schematically illustrated. The system 30 includes a single elevation monopulse antenna 32 having a top half 34 and a bottom half 36. Signal amplifiers 38 and 40 amplify the combined or composite direct path 16 and the bounce path 18 signals as received by the halves 34 and 36 of the antenna 32. Sum and difference circuits 42 and 44 form sum and difference signals from the combined RF direct and bounce signals which are then received by the sum and difference channels 46 and 48 of a two-channel receiver 50. A phase shifter 52 is provided prior to the difference channel 48 in order to introduce a 90° phase shift to bring the sum and difference channels 46 and 48 into phase. The receiver 50 in turn outputs in phase (I) and quadature (Q) signals 54 and 56 which are fed to an analog to digital converter 57. A central processing unit 58 in turn receives and processes the digital signals received from the converter 57. The central processing unit 58 further includes a memory circuit 60 for storing the digital signals and the calculated range to the noise emitter 10.

The operation of the system 30 will now be discussed in detail. It should be appreciated by one skilled in the art that the following equations/mathematical calculations are programmed into the system 30 using assembly language or other suitable programming languages for a particular application.

Referring now to FIG. 1, in order for the remote receiver 12 to passively determine a range (R) to the remote airborne noise emitter 10, both of which are elevated a distance above ground level, the antenna 32 is aligned substantially in the direction of the remote emitter 10. The antenna 32 receives direct and bounce path RF signals via the direct path 16 and the bounce path 18 such that the central processing unit 58 receives M number of I/Q time samples taken in both the sum and difference channels 46 and 48 of the receiver 50. If there was no noise at the receiver 50 or non-specular reflection from the ground level 14, then the signals along the direct and bounce paths 16 and 18, referred to as direct and bounce path signals, would be time delayed and scaled replicas of each other. Also, it is assumed that the airborne noise emitter 10 radiates uncorrelated Gaussian noise. The signal along the direct path 16 may be represented as proportional to a M-dimensional complex vector V. Each element in the vector V is a complex Gaussian random value, such that each real or imaginary part has zero mean. Similarly, the normalized signal along the bounce path 18 may be represented as a vector P which is retarded in time from the vector V by a delay of d range bins. The vectors V and P may be represented by the following equation:

$$P_k = V_{k-d} \qquad \text{Eq. 1}$$

A range bin is defined as an interval of time over which a single sample of a received signal from the airborne noise emitter 10 is taken. For convenience, it is assumed that the vector indices wrap-around modulo M, so that P and V have the same M elements cyclically shifted by a delay of d range bins.

The combined direct and bounce path signals are received through the sum and difference channels 46 and 48 and are a composite of the vectors P and V as scaled by antenna gain and bounce attenuation. Also, there is receiver noise independently added to each of the channels 46 and 48. The noise may also be represented by M-dimensional vectors of uncorrelated complex Gaussian random signals. Each noise I or Q component has zero mean and variance. The sum and difference circuitry 42 and 44 generate sum and difference signals from the signals received along the direct and bounce paths 16 and 18 from which the processing unit 58 generates sum and difference vectors which may be represented or modeled by the following equations:

$$S = V^* \text{sum}(\theta_1) + \text{atten}^* P^* \text{sum}(\theta_2) + ns \qquad \text{Eq. 2}$$

$$D = V^* \text{dif}(\theta_1) + \text{atten}^* P^* \text{dif}(\theta_2) + nd \qquad \text{Eq. 3}$$

The terms V and P represent the direct and bounce path complex vectors, sum($\theta_1$) and sum($\theta_2$) as well as dif($\theta_1$) and dif($\theta_2$) are the respective sum and difference antenna pattern voltage functions for the direct and bounce path signals, atten is the voltage bounce attenuation factor, and ns and nd are the receiver noise vectors.

In order to measure the time delay between the direct and bounce signals, the processing unit 58 employs correlation processing. For example, a correlation between two M-dimensional complex vectors A and B is also defined as a M-dimensional vector which may be defined by the following equations:

$$C = A \circledx B \qquad \text{Eq. 4}$$

$$C_k = (A \circledx B)_k = \frac{1}{M} \sum_{s=0}^{M-1} A_{s-k}^* B_s \qquad \text{Eq. 5}$$

where the indices are taken as cyclic modulo M. The correlation vector C is determined by shifting and complex conjugating the first vector A, multiplying by the second vector B element-wise, and adding for each cyclic shift of the elements A. This process is performed for each value of shift to form the correlation vector C. It should be noted that the correlation operation is non-commutative. That is, if the order of vectors A and B is reversed, a different vector C' is determined and defined as follows:

$$C = B \otimes A \qquad \text{Eq. 6}$$

$$C_k' = (B \otimes A)_k = \qquad \text{Eq. 7}$$

$$\frac{1}{M} \sum_{s=0}^{M-1} B_{s-k}^* A_s = \frac{1}{M} \left( \sum_{s=0}^{m-1} A_{s+k}^* B_s \right)^* = C_{-k}^*$$

Therefore, reversing the correlation order complex conjugates and reverses the order of the correlation vector elements.

In order to determine the difference in length of the direct and bounce paths 16 and 18 ($\Delta R$), a delay, in terms of range bins d, between reception by the antenna 32 of the direct and bounce path signals is determined. The correlation between the direct and bounce path normalized signal vectors V and P, from Equation 1, may be defined as:

$$(V \otimes P)_k = \frac{1}{M} \sum_{s=0}^{M-1} V_{s-k}^* P_s = \frac{1}{M} \sum_{s=0}^{M-1} V_{s-k}^* V_{s-d} \qquad \text{Eq. 8}$$

From this equation, in accordance with standard correlation principles, the correlation vector peaks when k=d, as expected. From Equation 7, it is clear that reversing the correlation operation between the vectors V and P tends to have a peak at element k=−d.

In order to determine the time delay between the reception of the direct and bounce signals along direct and bounce paths 16 and 18, the peaks of the auto correlation of the sum signal vector S are calculated as defined below:

$$(S \otimes S)_d = 2\sigma^2 \text{sum}(\theta_1)^* \text{sum}(\theta_2) \text{atten} \qquad \text{Eq. 9}$$

$$(S \otimes S)_{-d} = 2\sigma^2 \text{sum}(\theta_1) \text{sum}(\theta_2)^* \text{atten}^* \qquad \text{Eq. 10}$$

As is apparent from Equation 2, this auto correlation peaks up at three values of range bin shift: k=0, k=d and k=−d. At other shifts, the noise-like element voltages tend to average out. The case where k=0 is not especially interesting since all of the noise as well as both delayed and direct signals add together to form an average power. As will be discussed in detail below, the positions of the maximum auto correlation peaks representing the time delay between the reception of the direct and bounce path signals will be used to determine the difference in the lengths ($\Delta R$) of the direct and bounce paths 16 and 18. From Equations 9 and 10, it can be seen that the auto correlation peaks have the same magnitude but are complex conjugates of each other.

Next, the correlation between the sum and difference signal vectors S and D at a delay of k=d and k=−d are defined as follows:

$$(S \otimes D)_d = 2\sigma^2 \text{sum}(\theta_1)^* \text{dif}(\theta_2) \text{atten} \qquad \text{Eq. 11}$$

$$(S \otimes D)_{-d} = 2\sigma^2 \text{sum}^*(\theta_2) \text{dif}(\theta_1) \text{atten}^* \qquad \text{Eq. 12}$$

In order to determine the depression angles $\theta_1$ and $\theta_2$, as shown in FIG. 1, between the reference plane 20 and the direct and bounce path signals as represented by direct and bounce paths 16 and 18, discriminant vectors U at the delays d and −d are calculated as follows:

$$U_d \equiv \frac{\text{real}(S \otimes D)_d}{P_d} = \frac{\text{real}(S \otimes D)_d}{\text{real}(S \otimes S)_d} = \frac{\text{dif}(\theta_2)}{\text{sum}(\theta_2)} \qquad \text{Eq. 13}$$

$$U_{-d} \equiv U_{m-d} \equiv \frac{\text{real}(S \otimes D)_{m-d}}{P_d} = \frac{\text{real}(S \otimes D)_{m-d}}{\text{real}(S \otimes S)_{m-d}} = \frac{\text{dif}(\theta_1)}{\text{sum}(\theta_1)} \qquad \text{Eq. 14}$$

Because the signal phases of the sum vector S and difference vector D should be the same, one may take the real parts in the expressions to remove residual quadrature noise. The delay or shift is found by maximizing the following expression:

$$\max_{d=1,\ldots,M/2} P_d = \text{real} \left( \frac{(S \otimes S)_d + (S \otimes S)_{M-d}^*}{2} \right) \qquad \text{Eq. 15}$$

Since the auto correlation of S has two symmetric peaks at the appropriate d and −d shifts, one averages them in the above equation. $P_d$ is the maximum value at the shift d. The discriminants are determined at the delays d and −d corresponding to the peaks of the auto correlation defined in Equation 9 and 10. As can be seen, the early peak at d yields the usual discriminant vector for the bounce path 18 and the late peak at −d, equaling M−d modulo M, provides the direct path 16 discriminant vector. To determine the depression angles $\theta_1$ and $\theta_2$, one simply inverts the discriminant vector expressions $U_d$ and $U_{-d}$. That is, $\theta_1 = kU_{-d}$ and $\theta_2 = kU_{-d}$, where k is a known constant depending on the shape and size of the monopulse antenna 32.

In order to determine the path length difference $\Delta R$ between the direct and bounce paths 16 and 18, one multiplies the speed of light, c, by the time between samples, $\tau$, and by the shift d. Specifically, $\Delta R = c\tau d$. As will be shown by way of an example below, from the angular data, depression angles $\theta_1$ and $\theta_2$, and the path length difference data, $\Delta R$, the range R from the remote receiver 12 to the airborne noise emitter 10 may be calculated through a simple geometric triangulation computation.

Turning to FIG. 3, this triangulation computation is geometrically illustrated. Using the law of sines on the solid triangle 61, the following expression is obtained:

$$\frac{R}{\sin\left(\frac{\pi}{2} - \theta_2\right)} = \frac{R + \Delta R}{\sin\left(\frac{\pi}{2} + \theta_1\right)} \qquad \text{Eq. 16}$$

Simplification of this equation leads to the range R being defined as follows:

$$R = \Delta R \frac{\cos(\theta_2)}{\cos(\theta_1) - \cos(\theta_2)} \qquad \text{Eq. 17}$$

Figure 4:
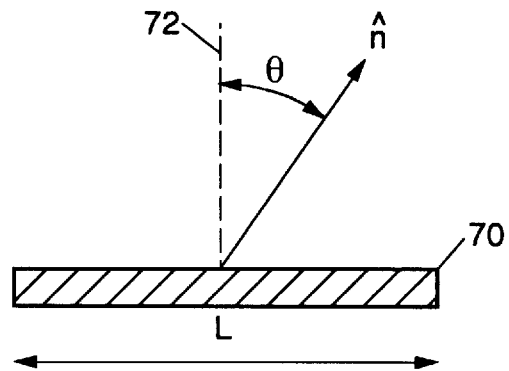
FIG. 4 schematically illustrates a linear uniformly weighted one-dimensional antenna of length L for approximating the monopulse antenna illustrated in FIG. 2 in accordance with the teachings of the present invention.

With reference to FIG. 4, the antenna 32 of FIG. 2, may be represented by a one-dimensional antenna 70 having a length L and a reference plane 72. It will be apparent that the angle $\theta$ represents either of the depression angles. A general formula for the pattern voltage V for the antenna 70 may be represented as follows:

$$V = \sum_k w_k \exp\left(\frac{2\pi j}{\lambda} \bar{x}_k \cdot \hat{n}\right) \qquad \text{Eq. 18}$$

Where $w_k$ is the amplitude at each radiating or receiving element at position $\bar{x}_k$. The $\hat{n}$ unit vector an represents the direction of interest in space which represents either the direct path 16 or bounce path 18 from the noise emitter 10. Also, the RF wavelength is represented by the $\lambda$. From equation 18, the sum voltage pattern received by the receiver 50 may be defined as follows:

$$\text{sum}(\theta) = \quad \text{Eq. 19}$$

$$\frac{1}{L} \int_{-\frac{L}{2}}^{\frac{L}{2}} \exp\left(\frac{2\pi j}{\lambda} \times \sin\theta\right) dx = \text{sinc}\left(\frac{\pi L}{\lambda} \sin\theta\right)$$

where sinc(x) is the usual sin(x)/x expression. Similarly, the difference voltage pattern may be defined as follows:

$$j * \text{dif}(\theta) = -\frac{1}{L} \int_{-\frac{L}{2}}^{0} \exp\left(\frac{2\pi j}{\lambda} \times \sin\theta\right) dx + \quad \text{Eq. 20}$$

$$\frac{1}{L} \int_{0}^{\frac{L}{2}} \exp\left(\frac{2\pi j}{\lambda} \times \sin\theta\right) dx$$

The imaginary j on the left side of the equation indicates that the expression on the right is also purely imaginary. The phase shifter 52 inserts the appropriate 90° phase shift to bring the sum and difference patterns into phase. A simplification of Equation 20 yields the final expression for the difference pattern:

$$\text{dif}(\theta) = \frac{\pi L \sin\theta}{2\lambda} \text{sinc}^2\left(\frac{\pi L \sin\theta}{2\lambda}\right) \quad \text{Eq. 21}$$

The discriminant U is defined as the ratio of the difference to sum patterns:

$$U(\theta) = \frac{\text{dif}(\theta)}{\text{sum}(\theta)} = \tan\left(\frac{\pi L}{2\lambda} \sin\theta\right) \quad \text{Eq. 22}$$

Solving for the corresponding angle θ from FIG. 4 in terms of the measured discriminant U, the following equation for the angle θ follows:

$$\theta = \sin^{-1}\left(\frac{2\lambda}{\pi L} \tan^{-1} U\right) \approx \frac{2\lambda}{\pi L} U \quad \text{Eq. 23}$$

The half-power beam width B follows from equation 19 by finding the angle at which the expression becomes $1/\sqrt{2}$:

$$\frac{1}{\sqrt{2}} = \text{sinc}\left[\frac{\pi L}{\lambda} \sin\left(\frac{B}{2}\right)\right] \quad \text{Eq. 24}$$

For typical values of L/λ, B is small enough to replace the sin function by its argument. Numerical solution of equation 24 yields an approximate value for B defined by:

$$B \approx .886 \frac{\lambda}{L} \quad \text{Eq. 25}$$

Using the expression for beam width in Equation 23, a good approximation for the angle θ in terms of the measured discriminant U is as follows:

$$\theta \approx \frac{B}{1.39} U \quad \text{Eq. 26}$$

Figure 5:
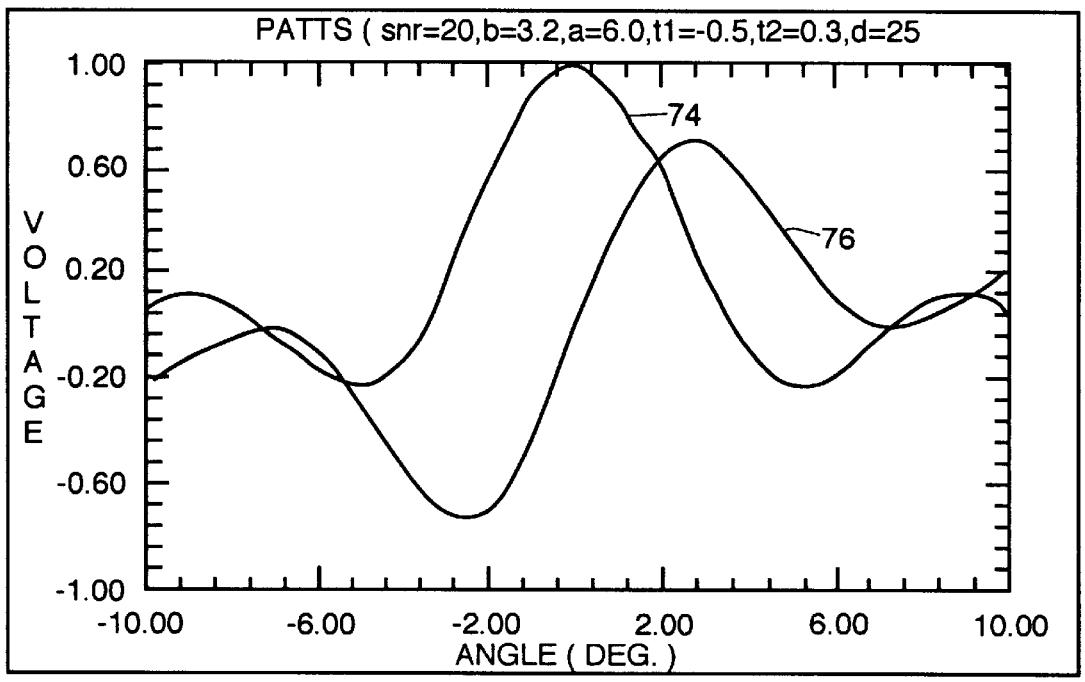
FIG. 5 is a graph of the sum and difference voltage patterns generated from the composite signal received by the monopulse antenna, as approximated by the one-dimensional antenna of FIG. 4.

With reference to FIG. 5, the sum voltage pattern 74 and difference pattern 76 from Equations 19 and 21 for a beam width B of 3.2° is shown.

An example of using the tracking system 30 for passively determining the range R from the remote receiver 12 to the airborne noise emitter 10, as illustrated in FIG. 1, will be described in conjunction with FIGS. 5–8.

The following example of passively determining the range R will be discussed for the case of $\theta_1=-0.5°$, $\theta_2=0.3°$, a signal delay d=25, a 6 dB bounce attenuation, a range sample vector with M=128 range bins, and a signal to noise ratio in the time series of 20 dB as represented by sum and difference voltage patterns 74 and 76 in FIG. 5.

Figure 6:
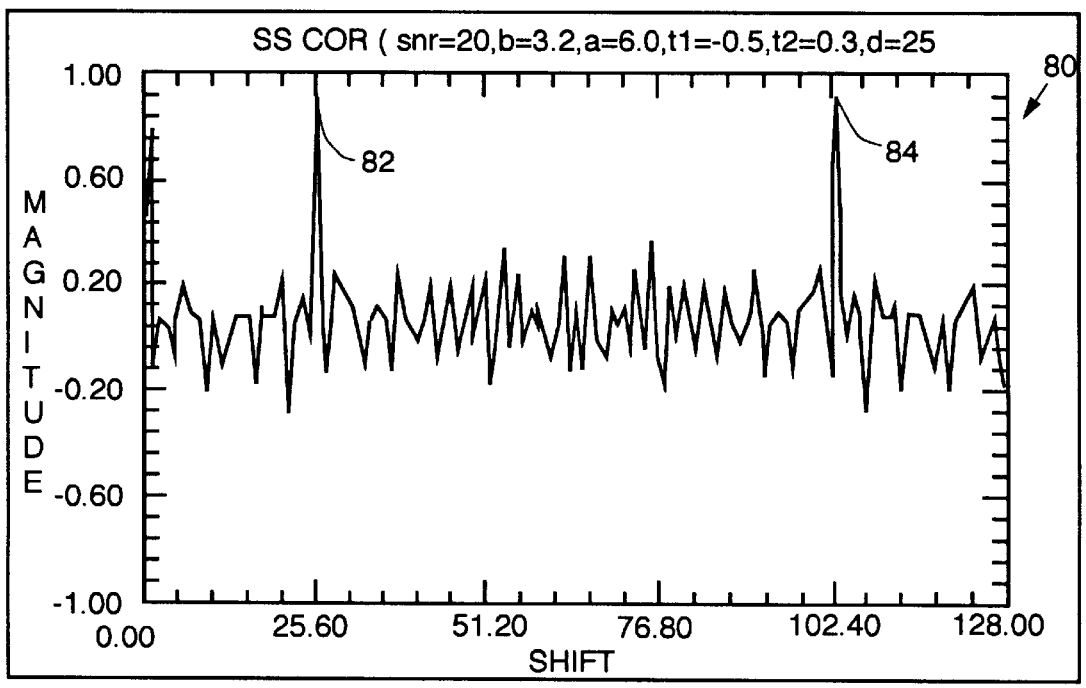
FIG. 6 is a graph of an auto correlation of a generated sum signal vector for determining a time delay between reception of the direct and bounce path signals.

Turning to FIG. 6, a graph 80 of the auto correlation of the sum pattern vector, sum(θ), is shown. The vertical axis represents the auto correlation magnitude and the horizonal axis represents the shift or delay in terms of range bins, of which 128 are utilized. From the graph 80, the auto correlation maximum peaks 82 and 84 are determined by the central processing unit 58. As shown, the correlation peaks 82 and 84 are at a delay of d=25 and -d=103, i.e. 128-25=103, range bins representing a time delay between the direct and bounce path signals 16 and 18 from the emitter 10 as expected. From these delay values, the path length difference ΔR of the direct and bounce paths 16 and 18 of FIGS. 1 may be determined through: ΔR=cτd where d=25.

Figure 7:
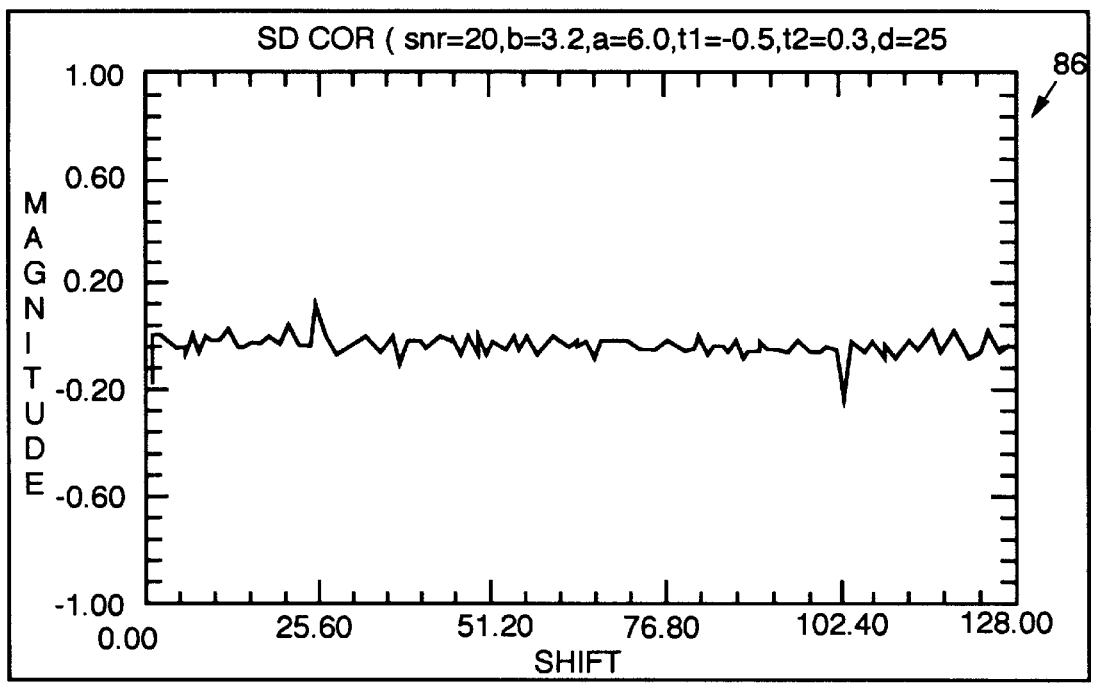
FIG. 7 is a graph of a correlation of the sum and difference vectors for determining the depression angles of the direct and bounce path signals.

With reference to FIG. 7, a graph 86 of the correlation between the sum pattern vector, sum(θ), and the difference pattern vector, dif(θ), is illustrated. Again, the vertical axis represents the magnitude of the correlation vector and the horizontal axis is the shift or delay in terms of the 128 range bins.

Figure 8:
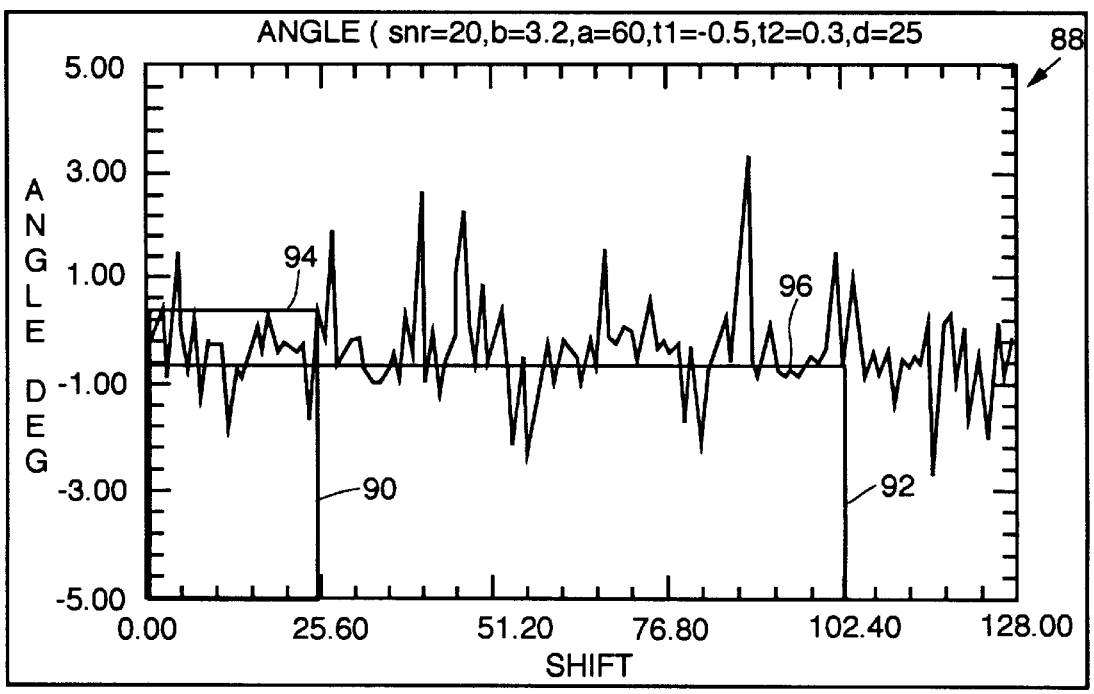
FIG. 8 is a graph of a discriminant vector calculated through division of the correlation vector illustrated in FIG. 7 by the auto correlation vector illustrated in FIG. 6 for determining the depression angles of the direct and bounce path signals.

Next, with reference to FIG. 8, a graph 88 of the discriminant vector is illustrated. This graph 88 represents the ratio of the graph 86 in FIG. 7 to the graph 80 in FIG. 6, i.e. the discriminant vector is determined by dividing the correlation vector by the sum channel auto correlation vector. The vertical lines 90 and 92 correspond to the shift or delay in terms of range bins at a value where the auto correlation peaks 82 and 84 occurred in FIG. 6. The horizontal lines 94 and 96 represent the corresponding discriminant angles at these peak shift points shown as lines 90 and 92. The depression angle $\theta_1$ is represented by the line 94 and equals -0.5° and the depression angle $\theta_2$ is represented by line 96 and equals 0.3°, as expected.

In summary, the shift or delay, d=25 and 128-d=103, in this example is determined from the graph in FIG. 6 in terms of range bins which enables the time delay between the direct and bounce path signals to be determined. From this delay, the path length difference ΔR between the direct and bounce path 16 and 18 is determined. As such, the range R is determined through Equation 17. This range R is then stored in the memory circuit 60 for further processing and/or uses such as guidance of an aircraft.

From the foregoing, it can be seen that compared to prior tracking systems, the passive tracking system 30 passively determines the location of an airborne noise emitter through sampling of radiated energy received along both direct and bounce paths which both may lie within the main beam of the received radiated energy. An additional advantage is that the monopulse antenna does not require maneuvering in order to determine the location of the remote noise emitter.

The foregoing discloses and describes merely exemplary embodiments of the present invention. One skilled in the art will readily recognize from such discussion and from the accompanying drawings and claims, that the various changes, modifications and variations can be made therein without departing from the spirit and scope of the present invention is defined by the following claims.

What is claimed is:

1. A method of passively determining a range to a remote signal emitter elevated a distance above ground level, comprising the steps of:

aligning an antenna, elevated a distance above the ground level, substantially in the direction of the remote signal emitter;

receiving a composite signal including combined direct and bounce path signals from the remote signal emitter with the same antenna; and calculating the range to the remote signal emitter based upon he combined direct and bounce path signals, including the steps of:
- (i) generating sum and difference signal vectors from the received combined direct and bounce path signals, and
- (ii) determining angular and path length data associated with the combined direct and bounce path signals received from the remote signal emitter as represented by the sum and difference signal vectors, including the steps of:
  - (a) determining a difference in lengths of the direct and bounce path signals from the remote signal emitter,
  - (b) determining a first angle between a reference plane substantially parallel to the ground level and the direct path signal, which includes the steps of:
    - (A) calculating a correlation between the sum and difference signal vectors,
    - (B) forming a discriminate vector by dividing the correlation of the sum and difference signal vectors by the auto correlation of the sum signal vector, and
    - (C) evaluating an angle of the discriminate vector at a first time delay corresponding to a first of the auto correlation peaks.
  - (c) determining a second angle between the reference plane and the bounce path signal, and
  - (d) determining a time delay between reception of the direct and bounce path signals by the antenna, which includes the steps of:
    - (A) calculating an auto correlation of the sum signal vector, and
    - (B) determining positions of maximum auto correlation peaks representing magnitudes of the time delay away from a zero time delay reference.

2. The method claim 1, further comprising the step of:
storing the calculated range to the remote signal emitter in a memory device for further processing.

3. The method of claim 1, wherein the step of determining the angular and path length data associated with the combined direct and bounce path signals includes the steps of:
determining a first angle between a reference plane substantially parallel to the ground level and the direct path signal; and
determining a second angle between the reference plane and the bounce path signal.

4. The method of claim 1, wherein the step of aligning the antenna includes:
aligning a single monopulse antenna in the direction of a main beam received from the remote signal emitter.

5. The method of claim 1, wherein the step of determining the difference in the lengths of the direct and bounce path signals received from the remote signal emitter includes:
determining a time delay between reception of the direct and bounce path signals by the antenna.

6. The method of claim 5, wherein the step of determining the time delay between reception of the direct and bounce path signals by the antenna includes:
calculating an auto correlation of the sum signal vector; and
determining positions of maximum auto correlation peaks representing the time delay away from a time delay reference.

7. The method of claim 1, wherein the step of determining the second angle between the reference plane and the bounce path signal includes:
evaluating an angle of the discriminate vector at a second later time delay corresponding to a second of the auto correlation peaks.

8. The method of claim 7, wherein the step of calculating the range to the remote signal emitter includes:
using the law of sines based upon the first angle, the second angle and path length difference represented by the time delay to determine the range.

* * * * *